Aug. 20, 1929.                F. L. BORCHERT                1,725,562
                                 CLUTCH
                            Filed June 20, 1927
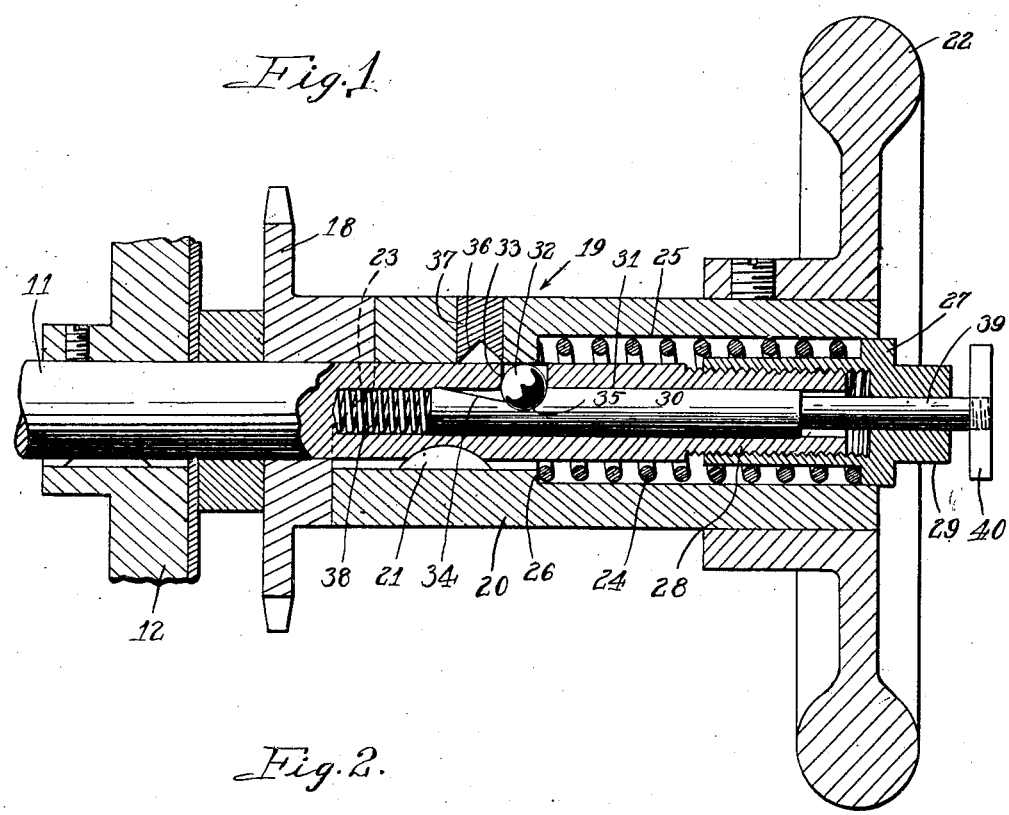
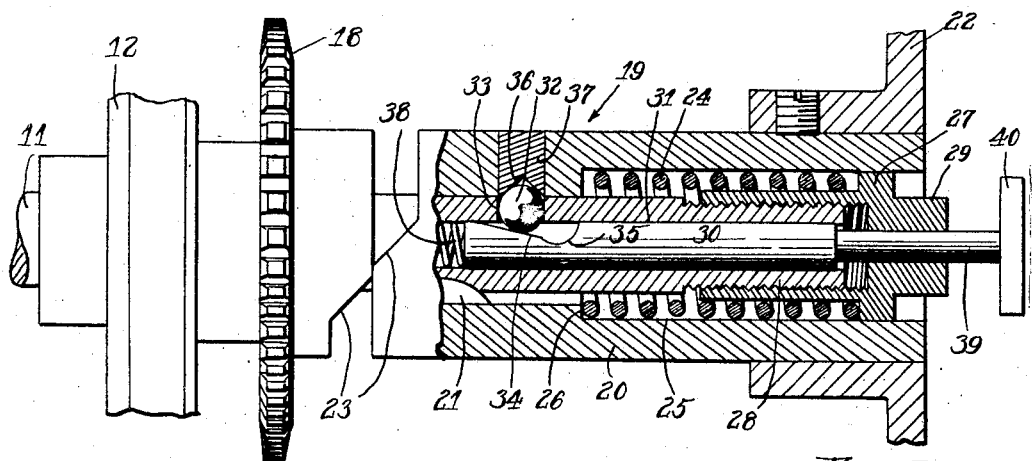
Inventor:
Fred L. Borchert
By
Wilson & McCanna
Attys Patented Aug. 20, 1929.

1,725,562

UNITED STATES PATENT OFFICE.

FRED L. BORCHERT, OF ROCKFORD, ILLINOIS.

CLUTCH.

Application filed June 20, 1927. Serial No. 199,972.

This invention relates generally to clutches, but has special reference to one arranged to release automatically under excessive load, the purpose being to avoid breakage of parts in a machine in case something jams or binds by accident or through mal-adjustment, or to avoid possible injury to the operator in the event his hands or clothing get caught in a moving part, thus obviating the necessity for complicated, cumbersome and expensive guards on the machine.

The clutch of my invention is so constructed, as hereinafter described, that the driving and driven parts when disengaged under the circumstances contemplated are locked in disengaged relation and cannot be reengaged except by the manual operation of a release provided for the purpose. The lock and its release constitute the principal features of my invention.

Another feature worthy of note is the provision of cam-shaped clutch faces which cause the parts to ride out of engagement under excessive resistance of the driven part; also the provision whereby the driven part constitutes a hand wheel for turning the machine over by hand when the power drive is disengaged, the hand wheel being so arranged with respect to the clutch that the application of hand pressure resisting the turning thereof is sufficient to disengage the power drive. Still other features will be referred to in the course of the following detailed description in which reference is made to the accompanying drawings wherein—

Figs. 1 and 2 are enlarged sectional views through the clutch showing the parts first in engaged relation and then in disengaged relation.

The same reference numerals are applied to corresponding parts in the two views.

This application is a continuation of my copending application Serial No. 72,618, filed December 2, 1925, as to all matter common to the two applications, the clutch having been illustrated and described in a general way in said application.

The clutch comprises a driving part, namely the sprocket 18, and a driven part in the form of a sleeve 20. The sprocket 18 is free to turn on the shaft 11 except when the clutch 19 is engaged, as in Fig. 1. The sleeve 20 is splined on the shaft 11, as indicated at 21, so that the hand wheel 22 fixed on the sleeve 20 may be moved endwise of the shaft but is held against rotation with respect thereto. This arrangement is made for the purpose of turning the shaft 11 by hand as, for example, when the clutch 19 is disengaged. Turning the machine over by hand becomes necessary when the operator wants to check the operation of any part or wants to turn the machine backwards to dislodge a crumpled cup, in the case of a filler and capper such as disclosed in my copending application above referred to, which may have brought about the stopping of the machine, as will presently appear. The sprocket 18 and sleeve 20 have complementary beveled or cam-shaped clutch faces 23 for transmitting the drive from the forcer to the latter when the parts are disposed, as shown in Fig. 1. A coiled compression spring 24 normally urges the sleeve 20 to the left to hold the clutch faces in engagement and is received in a counter-bore 25 in the end of the sleeve 20. The annular shoulder 26 at the inner end of the counter-bore forms an abutment for one end of the spring, and a nut 27 threading on the externally threaded end 28 of the shaft 11 forms an abutment for the other end of the spring. Obviously, an adjustment of the nut 27 will vary the load on the spring 24 and correspondingly vary the power which may be transmitted through the clutch 19 without its releasing. The inclination of the clutch faces 23 always places the sleeve 20 under more or less constraint to ride out of engagement with the sprocket 18 to the extent indicated in Fig. 2 so long as the shaft 11 meets with a normal amount of resistance to turning. The moment, however, that the resistance of the shaft 11 builds up to beyond a certain predetermined point, that is, when there is a definite overload, the spring 24 will not bring sufficient pressure to bear on the sleeve 20 to keep the clutch faces 23 engaged and, as a result, the sleeve 20 moves to the right, as shown in Fig. 2, leaving the sprocket 18 free for rotation relative to the shaft 11. The nut 27 has facets at 29 on the extending end thereof with which a wrench may be engaged to tighten or loosen the nut and correspondingly raise or lower the critical overload point.

In certain self-releasing clutches devised heretofore with which I am familiar there was no provision whereby to maintain the clutch disengaged or if the construction was such that the clutch remained disengaged there was no provision whereby the reengagement could be brought about in a practical way. According to the present invention these objections to previous types of clutches devised for a similar purpose are avoided by providing an automatic lock to keep the clutch disengaged after its automatic disengagement, the lock being so constructed that it may be released at will by simply pressing a button. The lock comprises a plunger 30 slidably received in a bore 31 made in the end of the shaft 11. The plunger 30 operates a ball detent 32 received in an opening 33 provided in the shaft 11 leading into the bore 31. An inclined cam face 34 produced on one side of the plunger 30 has a slight dip 35 at the inner end thereof in which the ball 32 is normally seated when in a retracted position, as shown in Fig. 1. However, when the sleeve 20 moves to the right in the disengagement of the clutch 19 the ball 32 rides on the cam face 34 and is thereby forced outwardly through the opening 33 into a conical recess 36 provided in a plug 37 driven into a hole drilled through the wall of the sleeve 20. The spline mounting of the sleeve 20 on the shaft 11 at 21 insures the proper registration of the ball detent 32 with the recess 36 and the moment the clutch 19 is disengaged to the full extent, so that the sleeve 20 is brought to the position shown in Fig. 2, it is locked by the ball detent 32. A coiled compression spring 38 acts between the inner end of the bore 31 and the end of the plunger 30 normally to urge the latter to the right to force the ball 32 outwardly toward the position shown in Fig. 2. The fact that the ball 32 is limited in its outward movement makes it unnecessary to limit the outward movement of the latch 30 for obvious reasons. The plunger 30 has a stem 39 projecting from the outer end thereof through the nut 27 and has a button 40 fixed on the outer end thereof. When the clutch 19 is locked in disengaged condition the mere act of pressing the button 40 to force the plunger 30 inwardly against the action of the spring 38 will serve to release the same. The inclined sides of the recess 36 in which the ball 32 is engaged will easily force the ball inwardly when the plunger 30 is moved inwardly to a retracted position. The moment the ball detent is out of the way, as shown in Fig. 1, the sleeve 20 moves to the left under the action of the spring 24 toward the engaged position shown in Fig. 1.

In operation, it will be apparent that the resistance to the turning of the shaft 11 may be caused in various ways. So far as the machine is concerned, it may arise by the jamming of the machine by a crumpled cup or by the dropping down to an arrest position of a rider when the cup dispenser for any reason fails to drop a cup into the conveyor, as described in my earlier application, or by the accidental catching of the operator's hand or clothing in a moving part of the machine. So far as the operator is concerned, he may bring about the stoppage of the machine by simply grasping the hand wheel 22, the hand pressure in that case affording sufficient resistance to the turning of the shaft 11 to bring about the release of the clutch. In this case the operator may move the hand wheel outwardly, that is, to the right as viewed in the drawings, so as not to rely entirely on the resistance to the turning of the shaft 11 occasioned by pressure on the hand wheel. The ball detent 32 clicks into place the moment the clutch parts are fully disengaged. When the power drive is thus disconnected the machine can be turned over by hand forwardly or backwardly and if a crumpled cup has caused the machine to stop the operator can remedy the difficulty and throw the machine back into operation. This is done by simply pressing the button 40. The location of the latter at the hand wheel obviously is very convenient for operation and centralizes the controls of the machine.

I claim:

1. In a clutch structure, the combination of a shaft having driving and driven members thereon, the one being free on the shaft and the other being held against turning on the shaft, means for transmitting power from the driving to the driven member arranged to be disengaged under excessive resistance of the driven member, means disposed within the shaft for automatically locking the members in disengaged relation and means operable from the end of the shaft to release the locking means for the reengagement of said members.

2. In a clutch structure, the combination of a shaft having driving and driven members thereon, the one being free on the shaft and the other being held against turning on the shaft, means for transmitting power from the driving to the driven member arranged to be disengaged under excessive resistance of the driven member, and means disposed within the shaft for automatically locking the members in disengaged relation.

3. In combination, a shaft having driving and driven members thereon, co-acting interengaging parts on said members for transmitting power from one member to the other, the one being free on said shaft and the other being held against turning on the shaft but arranged for sliding movement to and from the first member, spring means normally urging said parts toward clutching engagement but yieldable under excessive resistance to movement of the driven member to permit disengagement, and means disposed within the shaft and operable automatically upon the disengagement of the members to hold the one member in a retracted position on the shaft against the action of the spring means until it is desired to reengage the members.

4. In combination, a shaft having a driving and a driven member mounted thereon in co-axial relation, drive-transmitting parts on the two members for clutching the same together, said parts being disengageable upon axial movement of one member on the shaft relative to the other, a spring yieldingly urging the members toward clutching engagement, said spring being arranged to yield under excessive resistance of the driven member to permit relative axial movement of one of said members for the disengagement of the members, and means for locking the movable member in the disengaged position thereof, comprising a plunger slidable axially in a bore provided in said shaft, a second spring in said bore normally tending to move said plunger in one direction, and a detent operable by said plunger in the movement thereof into locking engagement with the movable member.

5. A clutch structure as set forth in claim 4 wherein the plunger has one end thereof projecting from the end of said shaft for manual operation against the action of the second spring.

6. In a clutch structure as set forth in claim 4 wherein the plunger has one end thereof projecting from the end of said shaft for manual operation against the action of the second spring, the projecting end of said plunger being suitably reduced and having a button on the free end thereof to facilitate manual operation, a nut threading on the end of said shaft providing an abutment for the first mentioned spring and having an opening therein serving as a guide for the reduced end portion of said plunger.

7. In combination, a shaft having a driving and a driven member thereon in co-axial relation, the driven member being fixed against rotation relative to the shaft and serving as a means for manually turning the same, as, for example, when the driving and driven members are disengaged, said driven member being movable axially on said shaft to disengaged position, drive-transmitting parts on the two members for clutching the same together, said parts being disengageable upon axial movement of one member relative to the other, a spring yieldingly urging the members together toward clutching engagement, said spring being arranged to yield under excessive resistance of the driven member to permit relative axial movement of one of said members for the disengagement of the members, a device received in the end of said shaft and movable axially relative thereto; for locking the driven member in the disengaged position thereof, said device being spring-pressed normally toward locking position, and a manually operable part extending from said device from the end of said shaft for convenient manual operation for moving said device against its spring pressure to unlock the driven member.

8. In combination, a shaft to which power is arranged to be transmitted, a driving member mounted for rotation on said shaft, a driven member fixed against rotation on said shaft, clutching faces provided on said members for drive transmitting purposes, one of said members being movable axially relative to the shaft for disengagement of said clutching faces, spring means yieldingly holding the members together in clutched relation but arranged upon excessive resistance to the turning of the shaft to permit axial movement of the movable member to a declutched position, and means operative between the movable member and the shaft to hold the member disengaged, said means comprising a plunger slidably received within the shaft, spring means normally urging the same in one direction toward locking position, and a detent operated by said plunger through an opening provided in the shaft for locking engagement with the movable member, said plunger having a stem portion extending from the end of the shaft to permit manual operation of the plunger against the action of its spring to unlock the movable member.

9. A clutch structure as set forth in claim 8 wherein the plunger has an inclined cam face thereon, and the detent rides on said face, the movable member having a recess therein for the reception of the detent, the action of the spring on the plunger serving to force the detent into the recess by cam action because of the inclined cam face provided on the plunger.

10. In combination, a shaft to which power is arranged to be transmitted, a driving member mounted for rotation on said shaft, a driven member fixed against rotation on said shaft and having freedom for axial movement thereon relative to the driving member, clutching faces provided on said members for drive transmitting purposes, said faces being of a cam form whereby to tend to move the driven member away from the driving member when the resistance to rotation of the driven member becomes excessive, a spring acting against the driven member and tending normally to keep the members engaged, the tension of said spring being proportioned according to the power to be transmitted to the driven member without its release, and means for locking said driven member disengaged comprising a plunger operating in a bore in the end of said shaft, a spring acting against one end of said plunger to move the same normally toward locking position, and a detent operated by said plunger toward locking engagement with the driven member.

11. A clutch structure as set forth in claim 10 including manually operable means for unlocking the driven member from disengaged position.

12. A clutch structure as set forth in claim 10 including manually operable means for unlocking the driven member from disengaged position, said means comprising a stem provided on said plunger and extending from the end of said shaft and having a button on the end thereof for convenient operation of the plunger against the action of its spring.

13. A clutch structure as set forth in claim 10 including a part threading on the end of said shaft providing abutment for one end of the first mentioned spring, said part being arranged to be threaded one way or another and thereby adjust the tension of the spring and correspondingly change the overload point at which the clutch will release.

In witness of the foregoing I affix my signature.

FRED L. BORCHERT.